F. H. VAN HOUTEN.
CUT-OFF FOR DOUGH HOPPERS AND THE LIKE.
APPLICATION FILED FEB. 1, 1916.
1,203,082. Patented Oct. 31, 1916.
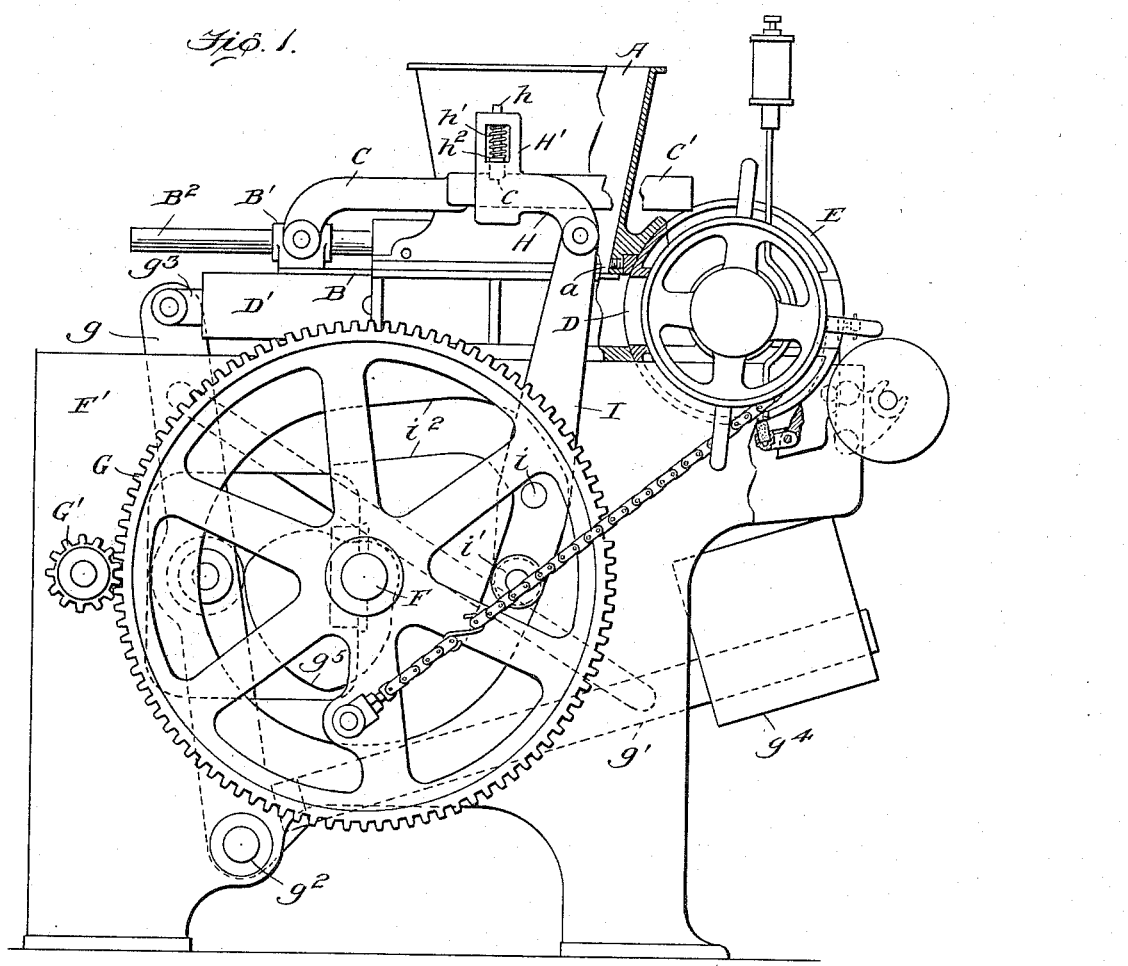
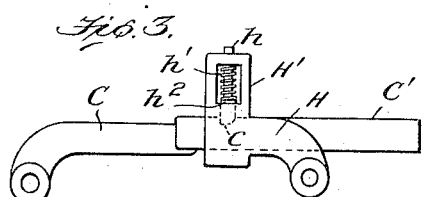
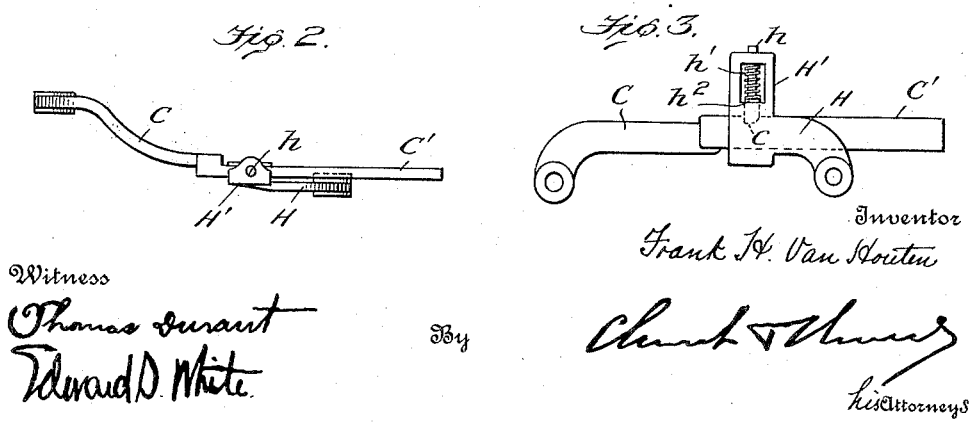
Witness
Thomas Durant
Edward D. White
Inventor
Frank H. Van Houten
By
his Attorneys

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

CUT-OFF FOR DOUGH-HOPPERS AND THE LIKE.

1,203,082.

Specification of Letters Patent.

Patented Oct. 31, 1916.

Application filed February 1, 1916. Serial No. 75,534.

*To all whom it may concern:*

Be it known that I, FRANK H. VAN HOUTEN, a citizen of the United States, residing at Beacon, in the county of Dutchess and State of New York, have invented a certain new and useful Improvement in Cut-Offs for Dough-Hoppers and the like; and I do hereby declare the following to be a full, clear, and exact description of the same, reference being had to the accompanying drawings, forming part of this specification.

This invention relates to an improved cut-off for dough hoppers and the like, such, for instance, as are embodied in my prior patent for a dough dividing machine No. 1,158,339, granted to me October 26, 1915. In dough dividing machines of the type shown in my said prior patent, the dough hopper is mounted above a compression chamber which receives the dough discharged through the outlet in the bottom of the hopper. Working within the compression chamber is a plunger which is retracted during feeding of the dough into the chamber and advanced after the chamber is filled with the proper quantity of dough to discharge the dough at a substantially predetermined pressure into the measuring pockets of a cylinder or drum which is then rotated to carry away the measuring pockets from filling position and discharge the measured batches of dough, this movement of the cylinder also bringing a series of empty pockets into registry with the outlet of the compression chamber. During the advance stroke of the plunger to force the dough into the measuring pockets of the cylinder, it is necessary that the outlet of the hopper be closed, in order to prevent the pressure of the dough in the hopper above the compression chamber from interfering with the movement of the plunger, and for this purpose it has been customary to provide a cut-off consisting of a blade which is moved forward when the plunger is advanced to close the outlet of the hopper and retracted when the plunger is retracted to permit a quantity of the dough in the hopper to pass into the compression chamber.

The object of the present invention will readily be understood in connection with dough machinery of the above described type, this object being to provide a cut-off which will be rendered inoperative by releasing it from its operating mechanism when the cut-off comes into contact with an obstruction sufficient, for instance, to retard its normal movement in closing the outlet of the hopper. It frequently happens that, owing to the carelessness of workmen or other causes, foreign objects are deposited in the hopper of the dough dividing machine and when the machine is set in operation, a foreign object coming in contact with the cut-off or blade will in all probability inflict serious damage to the working parts of the machine, the damage being augmented by reason of the fact that the cut-off is usually connected with the same power shaft which operates the other parts of the machine and thus the abnormal stress produced by sudden stoppage in the movement of the cut-off will be transmitted to practically every part of the machine. Danger of damage to the machine due to an obstruction in the path of the cut-off so as to retard its movement will be eliminated by the improved arrangement of the present invention which operates to release the cut-off from the operating mechanism when such an obstruction occurs and thus the cut-off may remain stationary while the other parts of the machine are doing their work in a normal manner. It will be understood, however, that the invention is not limited in its scope to the specific dough dividing machine herein described, but will be found to be of general utility in the art to which it relates and is capable of useful application with machines of other types as well.

The invention consists in the construction, arrangement and combination of parts, as will be described in the following specification and the novel features of the invention will be pointed out in the appended claims.

In the drawings: Figure 1 is a side elevation, partly in section, of a dough dividing machine equipped with a cut-off for the hopper embodying the present improvements, showing the parts in their normal position. Fig. 2 is an enlarged top plan view of the improved connections between the cut-off and its operating mechanism. Fig. 3 is an enlarged side elevation of said connections showing the parts in the position they assume when the cut-off is released from the operating mechanism.

Like characters of reference in the several figures indicate the same parts.

The machine adapted for illustrating the present invention embodies in its construction a hopper A having an outlet $a$ into which hopper the dough to be divided is deposited. Working beneath the hopper or at some other convenient point adjacent outlet $a$ is a reciprocatory cut-off consisting preferably of a knife B mounted to reciprocate in a suitable slideway in the frame of the machine, this knife being conveniently of the type employed in my said prior Patent No. 1,158,339. The knife B is provided with a head or sleeve B′ which is fixed to a knife stem B² slidable within a guide-way of suitable shape in the frame and moving in accord with the knife proper. Below the cut-off or knife B there is located a compression chamber D within which is a reciprocatory plunger or head D′ adapted to advance the dough deposited in the chamber to the head or cylinder E and to force the same into pockets in said cylinder at a substantially predetermined pressure. This system of operation has been set forth in my said prior patent and other prior patents granted to me, and needs no further description here.

The mechanism for operating the plunger D′ may be briefly described as follows: A cam shaft F is journaled in the frame F′ of the machine and receives motion through the medium of a large gear wheel G at one end of said shaft meshing with a pinion G′ forming port of a train of drive gearing receiving power from any suitable source. A weighted bell crank lever formed by the arms $g$ $g'$ is mounted on a transverse shaft $g^2$, the arm $g$ being pivotally connected by a suitable link connection $g^3$ with the rear end of the plunger G′ and an adjustable weight $g^4$ is mounted adjacent the outer end of arm $g'$. The weight $g^4$ serves as a means for advancing the plunger and dough and for forcing the dough into the measuring pockets, while a cam $g^5$ on the shaft F serves as the meas for retracting the plunger and elevating the weight $g^4$.

The principal feature of the present invention resides in the means whereby the knife or cut-off B may be released from its operating connections when the knife contacts with an obstruction sufficient to retard its normal movement, it being understood that in the present embodiment, as in my Patent No. 1,158,339, the knife B moves in accord with the plunger D′. Power to reciprocate the knife is derived from the large gear wheel G by the following connections: Pivoted to each side of head B′ on stem B² are links C, these being of similar construction and hence a link on one side only is illustrated in the drawings. The said links C are provided at their ends opposite the pivot with extensions or bars C′, each bar having at some convenient point on its upper edge a notch $c$. A second link H is provided with a head H′ having an opening adapted to receive the bar C′ of the link C, there being a link H on each side of the frame. Mounted within the head H′ of each link H is a vertical pin $h$ having its lower end positioned normally within the notch $c$ of bar C′, the lower end of the pin being yieldingly pressed into said notch $c$ by means of a spring $h'$, within a suitable recess in the head H′ and pressing on a shoulder $h^2$ of the pin $h$. The ends of the links H opposite to heads H′ are pivotally connected with lever arms I journaled in the main frame and one of which, i. e., the lever arm illustrated in the drawings, is provided at its lower end below the shaft $i$ connecting the lever arms I, with a projection or roller $i'$ adapted to coöperate with a cam groove $i^2$ on the inner face of the large gear G. A pair of links C and H constitutes, respectively, in effect, a single link composed of two members, one of which, as the link H, is movable relatively to the other, and the two members are normally held against relative movement by means of the pin $h$ engaging the notch $c$ of the extension or bar C′ of the link C. Accordingly, the motion of levers I caused by the travel of the projection or roller $i'$ in the cam groove $i^2$ will normally be transmitted to the links C and the knife or cut-off B will be reciprocated to intermittently open and close the outlet $a$ of the hopper in accord with the movements of the plunger D′. When, however, the knife B encounters an obstruction in its path, such as to interfere with its normal movement, the power exerted by levers I will lift the pins $h$ out of their respective sockets $c$ against the tension of the spring and thus permit the links H to slide freely on the extensions or bars C′. Sudden stoppage of the blade or cut-off B from any cause will not be transmitted to the levers I, the links H sliding freely on bars C′, and hence no interference whatsoever is offered to the movement of the other parts of the machine. The result is that there is little danger of breakage or other injury to the machine from stoppage of the cut-off B.

What is claimed is:

1. The combination of a dough hopper and the like having an outlet through which dough is discharged, a cut-off adapted to close the outlet of said hopper, operating mechanism for moving the cut-off into and out of outlet closing position, and means for rendering said operating mechanism inoperative with respect to the cut-off upon contact of the cut-off with an obstruction in its path sufficient to retard the normal movement of the cut-off.

2. The combination of a dough hopper and the like having an outlet through which dough is discharged, a cut-off adapted to close the outlet of said hopper, operating mechanism for moving the cut-off into and out of outlet closing position, and a yielding connection interposed between the operating mechanism and the cut off adapted to release the cut-off from the operating mechanism upon contact of the cut-off with an obstruction in its path sufficient to retard the normal movement of the cut-off.

3. The combination of a dough hopper and the like having an outlet through which dough is discharged, a reciprocatory blade adapted to intermittently close the outlet of said hopper, operating mechanism for reciprocating said blade and thereby moving it into and out of outlet closing position, and means for rendering said operating mechanism inoperative with respect to the blade upon contact of the blade with an obstruction in its path sufficient to retard the normal movement of the blade.

4. The combination of a dough hopper and the like having an outlet through which dough is discharged, a cut-off adapted to close the outlet of said hopper, operating mechanism for moving the cut-off into and out of outlet closing position, and a spring-pressed connecting member interposed between the operating mechanism and the cut-off adapted to release the cut-off from the operating mechanism upon contact of the cut-off with an obstruction in its path sufficient to retard the normal movement of the cut-off.

5. The combination of a dough hopper and the like, having an outlet through which dough is discharged, a cut-off adapted to close the outlet of said hopper, a notched bar connected with the cut-off, operating mechanism for moving the cut-off into and out of closing position, including a link having a head receiving said bar, a spring-pressed pin mounted in said head and adapted to enter the notch in the bar, whereby the bar may move normally in accord with the link and the link may slide on the bar upon contact of the cut-off with an obstruction in its path sufficient to retard the normal movement of the cut-off.

6. The combination of a dough hopper and the like, having an outlet through which dough is discharged, a cut-off adapted to close the outlet of said hopper, a link embodying two members slidable relatively to each other, one member being connected with said cut-off, means connected with the other member for reciprocating the same, and a spring-pressed connection for normally preventing relative movement of the two members.

FRANK H. VAN HOUTEN.

Copies of this patent may be obtained for five cents each, by addressing the "Commissioner of Patents, Washington, D. C."